(12) United States Patent
Geng et al.

(10) Patent No.: US 11,997,985 B2
(45) Date of Patent: Jun. 4, 2024

(54) PET FOOT WASHER

(71) Applicant: SHENZHEN UAH TECHNOLOGY CO., LTD, Guangdong (CN)

(72) Inventors: Qiang Geng, Guangdong (CN); Shengbo Lu, Guangdong (CN); Baihua Luo, Guangdong (CN); Weixin Luo, Guangdong (CN); Shen Tian, Guangdong (CN)

(73) Assignee: SHENZHEN UAH TECHNOLOGY CO., LTD, Shenzhen (CN)

( * ) Notice: Subject to any disclaimer, the term of this patent is extended or adjusted under 35 U.S.C. 154(b) by 167 days.

(21) Appl. No.: 17/881,581

(22) Filed: Aug. 4, 2022

(65) Prior Publication Data
US 2023/0404032 A1 Dec. 21, 2023

(30) Foreign Application Priority Data
Jun. 15, 2022 (CN) .......................... 202210674830.7

(51) Int. Cl.
*A01K 13/00* (2006.01)
(52) U.S. Cl.
CPC .................. *A01K 13/001* (2013.01)
(58) Field of Classification Search
CPC .... A01K 13/00; A01K 13/001; A01K 13/003; A61D 7/00; A61D 11/00
See application file for complete search history.

(56) References Cited

U.S. PATENT DOCUMENTS

| 2,255,081 A * | 9/1941 | Nielsen | A47L 15/0068 15/76 |
| 3,781,939 A * | 1/1974 | Qualheim | A47L 15/0068 15/76 |
| 4,011,621 A * | 3/1977 | Irvine | A47L 15/0068 15/164 |
| 4,554,696 A * | 11/1985 | Nye, Jr. | A63B 60/36 15/88.4 |
| 6,065,431 A * | 5/2000 | Davis | A01K 13/001 119/600 |
| 11,503,804 B1 * | 11/2022 | MacPherson | A46B 5/0012 |

(Continued)

FOREIGN PATENT DOCUMENTS

| CN | 107570504 A | 1/2018 |
| CN | 206978393 U | 2/2018 |

(Continued)

*Primary Examiner* — Ebony E Evans

(57) ABSTRACT

The application belongs to the technical field of pet instruments, in particular to a pet foot washer. The washer comprises a drive assembly and a cleaning bucket with a cleaning space; the drive assembly comprises a drive part, a wave transmission component, an installation block, an output shaft, a first drive pin and a second drive pin; a first end face and a second end face of the wave transmission component are both wave surfaces, the drive part is installed on the installation block, an output end of the drive part is connected with the wave transmission component, the wave transmission component is connected with the cleaning bucket through the output shaft; the first drive pin and the second drive pin are both rotatably installed on the installation block, and the wave transmission component is installed between the first drive pin and the second drive pin.

10 Claims, 8 Drawing Sheets

(56) References Cited

U.S. PATENT DOCUMENTS

| | | | | |
|---|---|---|---|---|
| 2014/0352629 | A1* | 12/2014 | Surmeli | ............... A01K 13/002 119/609 |
| 2017/0367297 | A1 | 12/2017 | Kim | |
| 2018/0255747 | A1* | 9/2018 | Barthle | ............... A46B 13/008 |

FOREIGN PATENT DOCUMENTS

| | | |
|---|---|---|
| CN | 208286153 U | 12/2018 |
| CN | 210202893 U | 3/2020 |
| CN | 210262042 U | 4/2020 |
| CN | 113711942 A | 11/2021 |
| CN | 215530796 U | 1/2022 |
| JP | 2011246165 A | 12/2011 |
| KR | 20170003094 U | 9/2017 |

* cited by examiner

PET FOOT WASHER

CROSS REFERENCE TO RELATED APPLICATIONS

The present application claims the benefit of Chinese Patent Application No. 202210674830.7 filed on Jun. 15, 2022, the contents of which are incorporated herein by reference in their entirety.

TECHNICAL FIELD

The application belongs to the technical field of pet instruments, in particular to a pet foot washer.

BACKGROUND

With the development of social economy and the acceleration of urbanization, more and more people like to live in their own small circles, and their interpersonal communication is becoming less and less. Pets such as cats and dogs can be people's friendly companions. These pets can not only help people get rid of loneliness in life, but also adjust people's mental health. And, for some elderly people who live alone, pets are their life partners. Keeping pets is beneficial to the physical and mental health of the elderly, and the life of the elderly can be fulfilling and enriched through communication with pets.

Walking on the ground, pet feet usually get dirty, which requires frequent cleaning. With the development of science and technology, more and more pet foot washing cups are available on the market, which can clean the pet feet. However, the existing pet foot washing cups can only function by driving the brush to rotate, and the rotating brush has the problem that the pet feet can't be cleaned cleanly.

SUMMARY

The application provides a pet foot washer, aiming at the technical problem that the existing pet foot washing cup can not clean the pet feet well.

In view of the above technical problem, embodiments of the present application provides a pet foot washer, including a drive assembly and a cleaning bucket with a cleaning space; the drive assembly includes a drive part, a wave transmission component, an installation block, an output shaft, a first drive pin and a second drive pin; a first end face and a second end face of the wave transmission component are both wave surfaces, the drive part is installed on the installation block, an output end of the drive part is connected with the wave transmission component, the wave transmission component is connected with the cleaning bucket through the output shaft; the first drive pin and the second drive pin are both rotatably installed on the installation block, and the wave transmission component is installed between the first drive pin and the second drive pin.

Optionally, the first drive pin is provided with a first tapered part abutting against the first end face, and a cross-sectional area of the first tapered part gradually decreases in a direction toward a center of the wave transmission component; and the second drive pin is provided with a second tapered part abutting against the second end face, and a cross-sectional area of the second tapered part gradually decreases in a direction toward a center of the wave transmission component.

Optionally, an axis of the first tapered part and an axis of the second tapered part both intersect with an axis of the wave transmission component.

Optionally, both the first end face and the second end face are sine wave faces or cosine wave faces.

Optionally, the drive assembly further includes a slide bar, a bottom plate and a top plate, and the bottom plate and the top plate are both installed on the output shaft; the installation block is also provided with a slide hole, the slide bar is connected between the bottom plate and the top plate, and the installation block is slidably installed on the slide bar through the slide hole.

Optionally, the wave transmission component is a wave gear, and the drive assembly further includes a drive gear rotatably mounted on the installation block, the output end of the drive part is connected to the drive gear, and the drive gear meshes with the wave gear.

Optionally, the installation block is provided with a first receiving groove, and a second receiving groove communicating with the first receiving groove; the drive gear is installed in the first receiving groove, and the wave gear is installed in the second receiving groove.

Optionally, the pet foot washer further includes an installation seat provided with an installation space, and the drive assembly is installed in the installation space.

Optionally, the cleaning bucket includes a bucket body with the cleaning space and a brush installed in the cleaning space; and the output shaft is connected with the bucket body or the brush.

Optionally, the cleaning bucket is provided with a groove, an inner wall of the groove is provided with an insertion part, an end of the output shaft away from the wave gear is provided with an insertion hole, the output shaft is inserted into the groove, and the insertion part is inserted into the insertion hole.

In the present application, the first end face and second end face of the wave transmission component are both wave faces, and the drive part is installed on the installation block, the output end of the drive part is connected with the wave transmission component, which is connected with the cleaning bucket through the output shaft; the first drive pin and second drive pin are both rotatably installed on the installation block, the wave transmission component is installed between the first drive pin and the second drive pin; the first drive pin abuts against the first end face of the wave transmission component, and the second drive pin abuts against the second end face of the wave transmission component. The working principle of the pet foot washer is as follow: when the installation block remains stationary, the output end of the drive part drives the wave transmission component to rotate between the first drive pin and second drive pin. The first end face and second end face of the wave transmission component are both undulating wave faces, so while the wave transmission component drives the output shaft to rotate, the output shaft would also be driven to reciprocate up and down, and the output shaft would further drive the cleaning bucket to rotate, at the same time, the cleaning bucket would be driven to reciprocate up and down. The brush in the cleaning space of the cleaning bucket also reciprocates up and down while rotating, so that the cleaning bucket can clean the pet feet (including pet legs and paws) more cleanly; and the pet foot washer can realize the rotation and up-and-down reciprocating motion of the cleaning bucket simply by the first drive part, therefore the pet foot washer is simple in structure, low in manufacturing cost and convenient to use.

BRIEF DESCRIPTION OF THE DRAWINGS

The present application is further illustrated with reference to the following drawings and embodiments.

Figure 1:
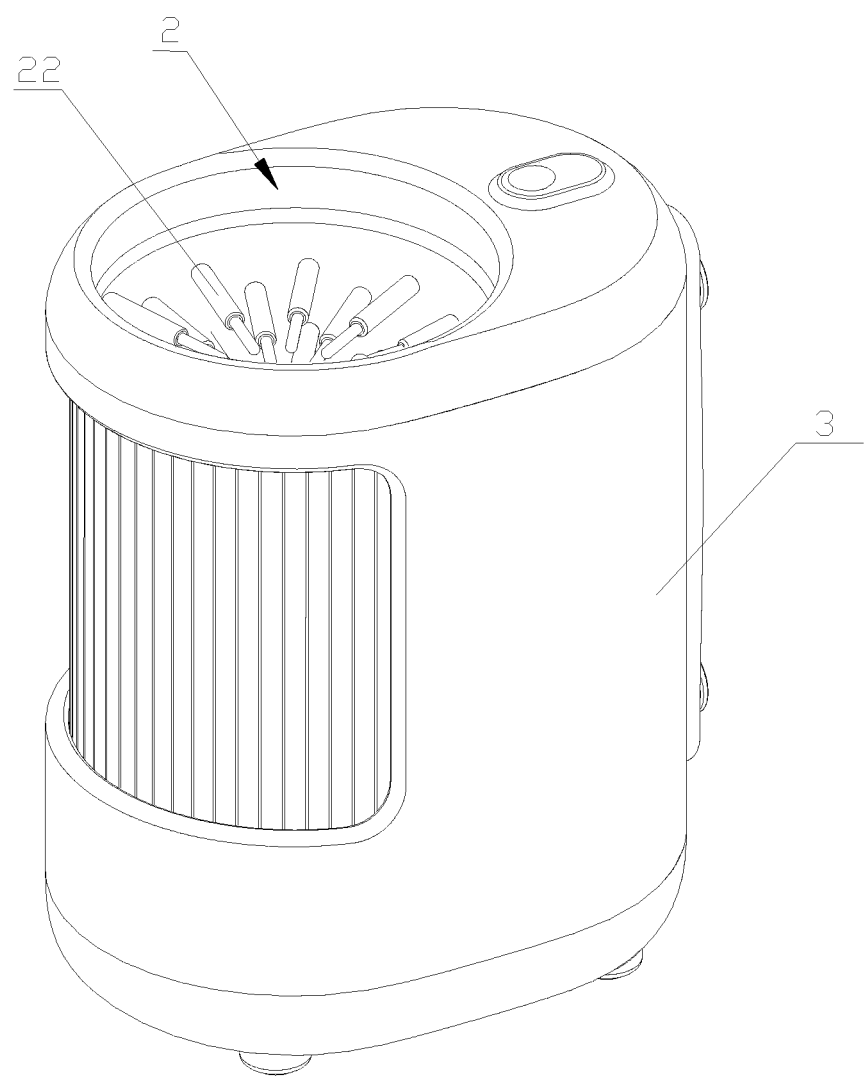
FIG. 1 is a structural schematic diagram of a pet foot washer provided by an embodiment of the present application.

Reference Signs in the Figures are as Follows:
1. Drive assembly; 11. Drive part; 12. Wave transmission component; 121. First end face; 1211. First annular contact part; 122. Second end face; 13. Installation block; 131. First receiving groove; 132. Second receiving groove; 133. Slide hole; 14. Output shaft; 141. Insertion hole; 15. First drive pin; 151. First tapered part; 16. Second drive pin; 161. Second tapered part; 17. Slide bar; 18. Bottom plate; 19. Top plate; 101. Drive gear; 2. Cleaning bucket; 21. Bucket body; 211. Cleaning space; 22. Brush; 23. Groove; 24. Insertion part; 3. Installation seat.

DETAILED DESCRIPTION OF DISCLOSED EMBODIMENTS

In order to make the beneficial effects, technical solutions and technical problems solved by the present application clearer, the present application will be further illustrated in detail with reference to the drawings and embodiments. It should be understood that the specific embodiments described here are merely for illustrating the present application, but not for limiting the present application.

It should be understood that the directions or positional relationships indicated by the terms "upper", "lower", "left", "right", "front", "back" and "middle" are based on the directions or positional relationships shown in the drawings, only for convenience of describing the present application and simplifying the descriptions, instead of indicating or implying that the device or element must have a specific orientation, be constructed or operated in a specific orientation, and therefore cannot be understood as a limitation of the present application.

As shown in FIGS. 1 to 4, a pet foot washer provided by an embodiment of the present application, includes a drive assembly 1 and a cleaning bucket 2 with a cleaning space 211; the drive assembly 1 includes a drive part 11, a wave transmission component 12, an installation block 13, an output shaft 14, a first drive pin 15 and a second drive pin 16; a first end face 121 and a second end face 122 of the wave transmission component 12 are both wave faces, and the drive part 11 is installed on the installation block 13; an output end of the drive part 11 is connected to the wave transmission component 12, and the wave transmission component 12 is connected to the cleaning bucket 2 through the output shaft 14; the first drive pin 15 and the second drive pin 16 are both rotatably installed on the installation block 13, and the wave transmission component 12 is installed between the first drive pin 15 and the second drive pin 16. Understandably, the drive part 11 includes but is not limited to a motor, etc. The first end face 121 and the second end face 122 are both undulating wave faces, i. e., the first end face 121 is not on a same plane, and the second end face 122 is not on a same plane. And both the first end face 121 and second end face 122 are designed based on the wave shapes (sine wave, cosine wave, etc.).

Furthermore, on any cross section of the wave transmission component 12, the distance between the first end face 121 and second end face 122 is the same. Preferably, the output shaft 14 and the wave transmission component 12 are integrally formed.

In the present application, the first end face 121 and second end face 122 of the wave transmission component 12 are both wave faces, and the drive part 11 is installed on the installation block 13; the output end of the drive part 11 is connected to the wave transmission component 12, and the wave transmission component 12 is connected to the cleaning bucket 2 through the output shaft 14. The first drive pin 15 and the second drive pin 16 are both rotatably mounted on the installation block 13, the wave transmission component 12 is installed between the first drive pin 15 and second drive pin 16, the first drive pin 15 abuts against the first end face 121 of the wave transmission component 12, and the second drive pin 16 abuts against the second end face 122 of the wave transmission component 12. The working principle of the pet foot washer is as follow: when the installation block 13 remains stationary, the output end of the drive part 11 drives the wave transmission component 12 to rotate between the first drive pin 15 and second drive pin 16. The first end face 121 and second end face 122 of the wave transmission component 12 are both undulating wave faces, the rotating wave transmission component 12 drives itself to reciprocate up and down through the first drive pin 15 and second drive pin 16, so while the wave transmission component 12 drives the output shaft 14 to rotate, the output shaft 14 would also be driven to reciprocate up and down, and the output shaft 14 would further drive the cleaning bucket 2 to rotate, at the same time, the cleaning bucket 2 would be driven to reciprocate up and down. The brush 22 in the cleaning space 211 of the cleaning bucket 2 also reciprocates up and down while rotating, so that the cleaning bucket 2 can clean the pet feet (including pet legs and paws) more cleanly; and the pet foot washer can realize the rotation and up-and-down reciprocating motion of the cleaning bucket 2 simply by the first drive part 11, therefore the pet foot washer is simple in structure, low in manufacturing cost and convenient to use.

Figure 6:
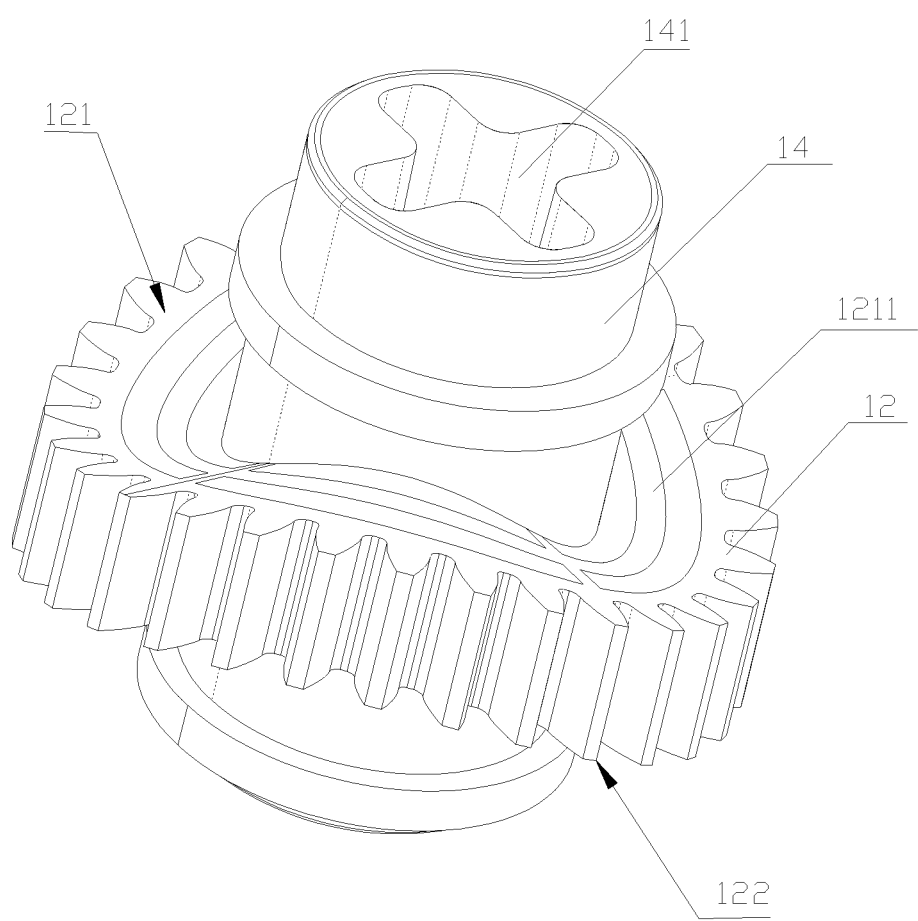
FIG. 6 is a structural schematic diagram of a wave transmission component and an output shaft of a pet foot washer provided by an embodiment of the present application.

In an embodiment, as shown in FIG. 6, the wave transmission component 12 is a wave gear, the drive assembly 1 further includes a drive gear 101 rotatably mounted on the installation block 13, the output end of the drive part 11 is connected to the drive gear 101, and the drive gear 101 meshes with the wave gear. Understandably, the first end face 121 and second end face 122 of the wave gear are both undulating wave faces, the drive part 11 drives the drive gear 101 to rotate, the drive gear 101 drives the wave gear to rotate, and the wave gear further drives the output shaft 14 to move. In this embodiment, the design of the drive gear 101 makes the structure of the pet foot washer compact thus reducing the size of the pet foot washer.

In other embodiments, the drive assembly 1 further includes a transmission gear, and the drive gear 101 is engaged with the wave transmission component through the transmission gear. That is, the drive gear 101 is engaged with the transmission gear, and the transmission gear is engaged with the wave transmission component. Furthermore, one or more transmission gears may be provided according to actual requirements.

Figure 5:
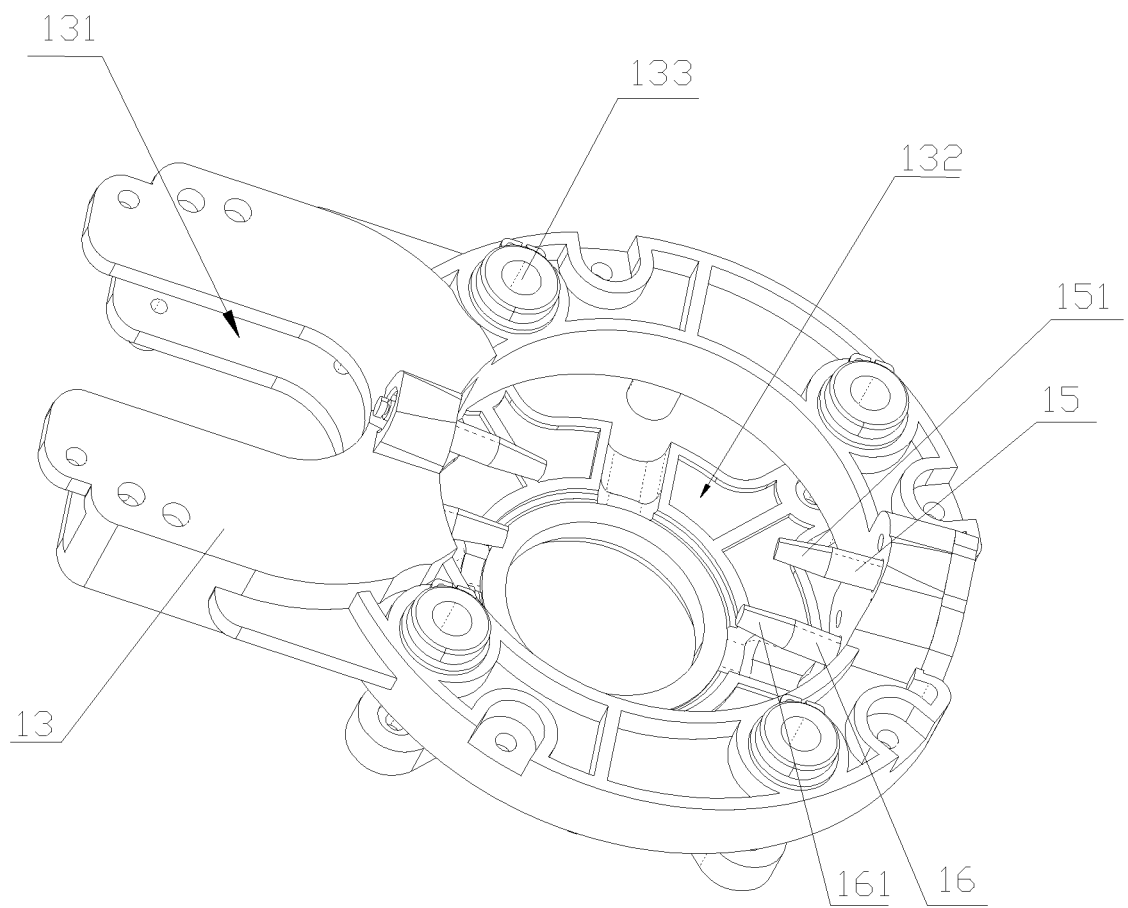
FIG. 5 is a structural schematic diagram of an installation block, a first drive pin and a second drive pin of a drive assembly provided by an embodiment of the present application.

In an embodiment, as shown in FIG. 5, the first drive pin 15 is provided with a first tapered part 151 abutting against the first end face 121, and the cross-sectional area of the first tapered part 151 gradually decreases toward the center of the wave transmission component 12. That is, the end face of the first tapered part 151 with a small cross-sectional area faces the center of the wave transmission component 12, and the first tapered part 151 may be a cone or a truncated cone.

The second drive pin 16 is provided with a second tapered part 161 abutting against the second end face 122, and the cross-sectional area of the second tapered part 161 gradually decreases toward the center of the wave transmission component 12. That is, the end face of the second tapered part 161 with a small cross-sectional area faces the center of the wave transmission component 12, and the second tapered part 161 may be a cone or a truncated cone. Understandably, both the first drive pin 15 and second drive pin 16 include a cylinder and a cone connecting the cylinder, the cylinder is rotatably mounted on the installation block 13, and the cone abuts against the first end face 121 or second end face 122. Specifically, when the wave transmission component 12 rotates, the first drive pin 15 would be driven to rotate by the first tapered part 151, and at the same time, the second drive pin 16 would be driven to rotate by the second tapered part 161. As the linear speed of the wave transmission component 12 near the center is larger, the ends of the first drive pin 15 and the second drive pin 16 are designed to be tapered, the linear speeds of the first tapered part 151 and the second tapered part 161 near the center of the wave transmission component 12 are smaller. Thereby, the first tapered part 151 and the second tapered part 161 can match the speed of the wave transmission component 12. In addition, the wave transmission component 12 not only rotates radially, but also moves axially. The design of the first tapered part 151 and second tapered part 161 ensures the stability of the axial movement of the wave transmission component 12. In this embodiment, the first drive pin 15 and second drive pin 16 are both mounted on the installation block 13 through bearings. The wave transmission component 12 drives the first drive pin 15 to rotate through the first tapered part 151, and simultaneously drives the second drive pin 16 to rotate through the second tapered part 161. That is, pure roll motion of the first drive pin 15 occurs on the first end face 121, and pure roll motion of the second drive pin 16 occurs on the second end face 122. In this way, there is no need to add lubricating substances such as lubricating oil and grease to the positions where the first drive pin 15 and the second drive pin 16 are rotationally connected with the wave transmission component 12, thereby reducing the manufacturing cost of the pet foot washer and facilitating the disassembly and assembly of the pet foot washer.

It should be noted that because of the undulating spoke arc faces of the first end face 121 and second end face 122, the wave gear can reciprocate up and down under the pressure of the first tapered part 151 of the first drive pin 15 or the second tapered part 161 of the second drive pin 16.

Figure 8:
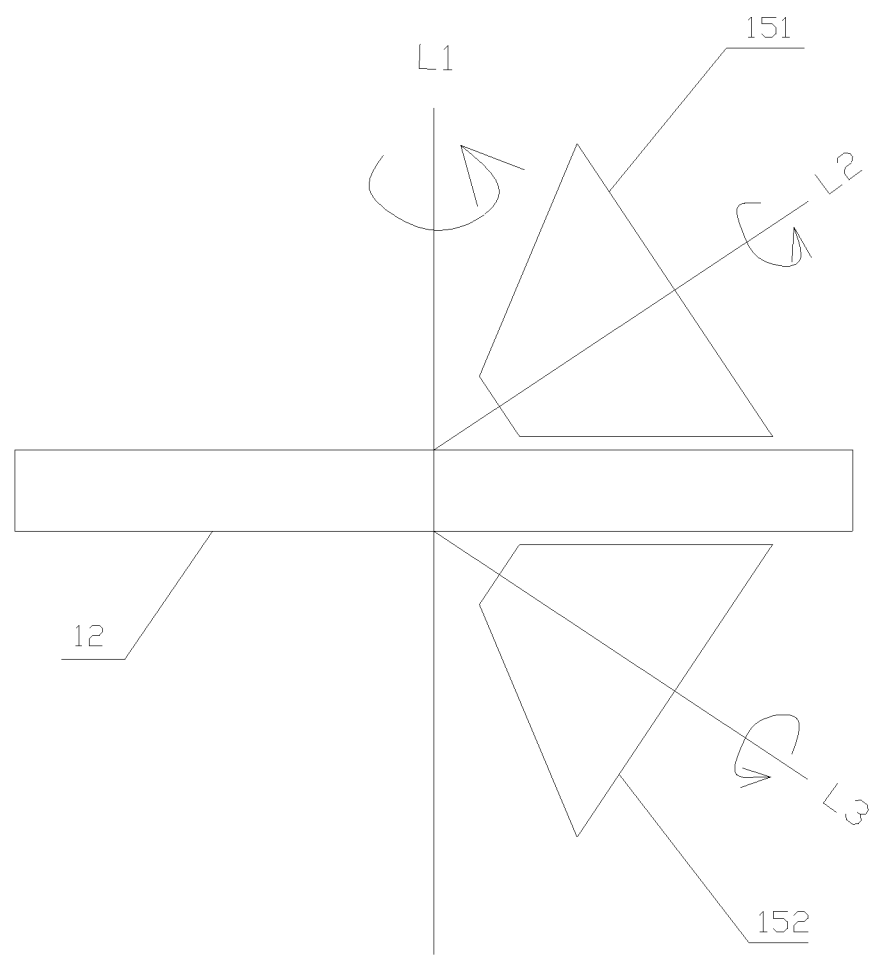
FIG. 8 is a schematic diagram of a wave transmission component, a first drive pin and a second drive pin provided by an embodiment of the present application.

In an embodiment, as shown in FIG. 8, the axis L2 of the first tapered part 151 and the axis L3 of the second tapered part 161 both intersect the axis L1 of the wave transmission component 12. That is, the axis L2 of the first tapered part 151 intersects with the axis L1 of the wave transmission component 12, and the axis L3 of the second tapered part 161 also intersects with the axis L1 of the wave transmission component 12. In this embodiment, the first drive pin 15 and the second drive pin 16 can better match the speed of the wave transmission component 12, so that the first drive pin 15 and the second drive pin 16 can rotate more smoothly.

Preferably, the drive assembly 1 includes two drive pin assemblies, each of which includes a first drive pin 15 and a second drive pin 16 in the same vertical plane, and the two drive pin assemblies are located on opposite sides of the wave transmission component 12. That is, the wave transmission component 12 is clamped between the two driving pin assemblies, which ensures the movement stability of the wave transmission component 12.

Further, the first end face 121 is provided with a first annular concave portion and a second annular concave portion which are distributed at intervals, a first annular contact part 1211 is arranged between the first annular concave portion and the second annular concave portion, and the first tapered part 151 abuts against the first annular contact part 1211. Similarly, the second end face 122 is provided with a third annular concave portion (not shown) and a fourth annular concave portion (not shown) which are distributed at intervals, a second annular contact part (not shown) is formed between the third annular concave portion and the fourth annular concave portion, and the second tapered part 161 abuts against the second annular contact part. Understandably, because the wave gear is made of plastic and has a large width, in order to avoid deformation of the corrugated shapes of the first end face and the second end face and deformation of the meshing teeth of the wave gear when the wave gear is processed, the first end face 121 is provided with the first annular concave portion and second concave portion which are concave downward, the second end face 122 is provided with the third annular concave portion and fourth annular concave portion which are concave upward, so that the thickness distribution of each end face of the wave transmission component 12 is uniform, and the wave transmission component 12 with uniform thickness reduces the situations of size shrinkage and deformation of the wave transmission component 12 during injection molding. And, the first annular contact part 1211 drives the first drive pin 15 to rotate, and the second annular contact part drives the second drive pin 16 to rotate, thus ensuring the normal operation of the drive assembly 1.

In an embodiment, as shown in FIG. 6, both the first end face 121 and second end face 122 are sine wave faces or cosine wave faces. Understandably, in the same circle, the lines of the first end face 121 and second end face 122 are shown as sinusoidal waveform or cosine waveform. In this embodiment, the end face of the wave transmission component 12 is designed as a sine wave face or cosine wave face, thereby reducing the design difficulty of the wave transmission component 12 and further reducing the manufacturing cost of the wave transmission component 12.

Further, the number of wave faces on the first end face 121 and second end face 122 is even (for example, 2, 4, 8, etc.) That is, the first end face 121 and second end face 122 have even sine wave faces or cosine wave faces. Understandably, the number of waveforms of the wave faces is equal to the number of the first drive pin 15 (i. e., the second drive pin 16). As shown in FIGS. 5 and 6, there are two first drive pins 15 and two second drive pins 16, and the first end face 121 and second end face 122 of the wave gear are double wave faces. The corresponding design of the transmission pin and the wave face ensures the mechanical balance of the drive assembly 1 and the transmission stability of the wave gear.

Figure 3:
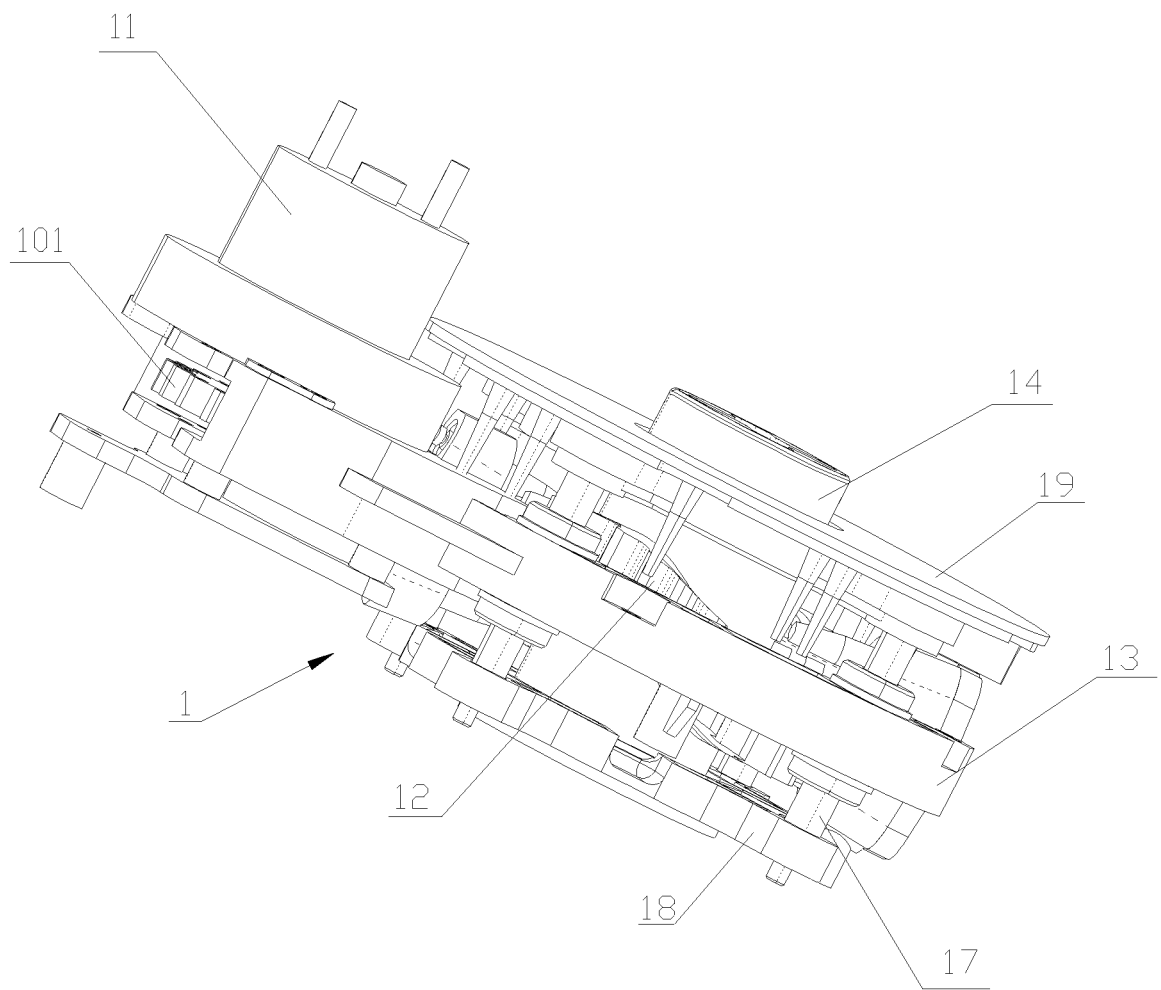
FIG. 3 is a structural schematic diagram of a drive assembly of a pet foot washer provided by an embodiment of the present application.
Figure 4:
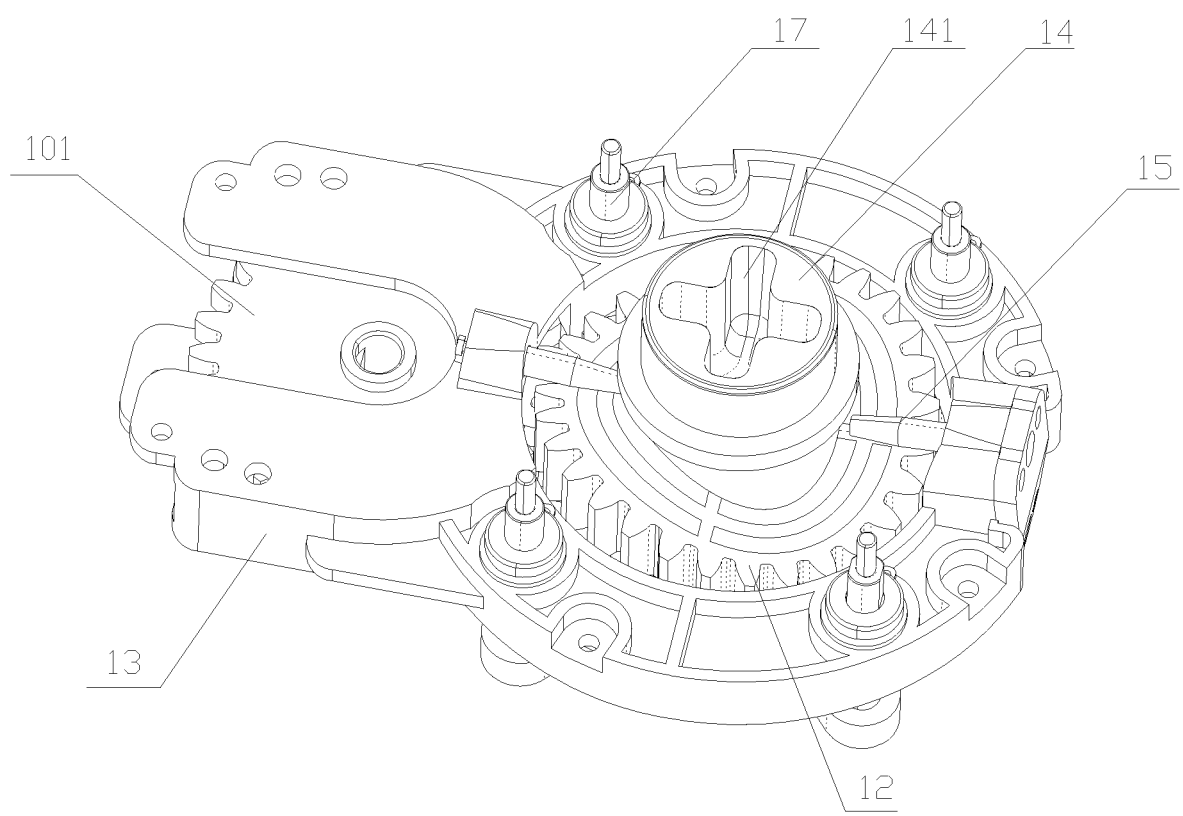
FIG. 4 is a partial structural diagram of a drive assembly provided by an embodiment of the present application.

In an embodiment, as shown in FIG. 3 and FIG. 4, the drive assembly 1 further includes a slide bar 17, and a bottom plate 18 and a top plate 19 both installed on the output shaft 14; the installation block 13 is further provided with a slide hole 133, the slide bar 17 is connected between the bottom plate 18 and the top plate 19, and the installation block 13 is slidably mounted on the slide bar 17 through the slide hole 133. Understandably, a plurality of the slide hole 133 and the slide bar 17 can be provided according to actual requirements, such as 4, 6, etc. The installation block 13 is positioned between the bottom plate 18 and the top plate 19, and the wave transmission component 12, bottom plate 18 and top plate 19 synchronously reciprocate up and down. The wave transmission component 12 reciprocates up and down along the slide bar 17 through the slide hole 133, thus further ensuring the movement stability of the wave transmission component 12. In addition, the top plate 19 can also play a role of supporting the cleaning bucket 2, thereby ensuring the stability of the output shaft 14 driving the cleaning bucket 2 to move.

In an embodiment, as shown in FIGS. 4 and 5, the installation block 13 is provided with a first receiving groove 131 and a second receiving groove 132 communicating with the first receiving groove 131; the drive gear 101 is installed in the first receiving groove 131, and the wave gear is installed in the second receiving groove 132. Understandably, the drive part 11 is installed above the installation block 13, and the rotating shaft of the drive part 11 extends into the first receiving groove 131 and connects with the drive gear 101. In this embodiment, the first receiving groove 131 and the second receiving groove 132 are designed side by side, which makes the drive assembly 1 compact in structure and convenient to install.

Figure 2:
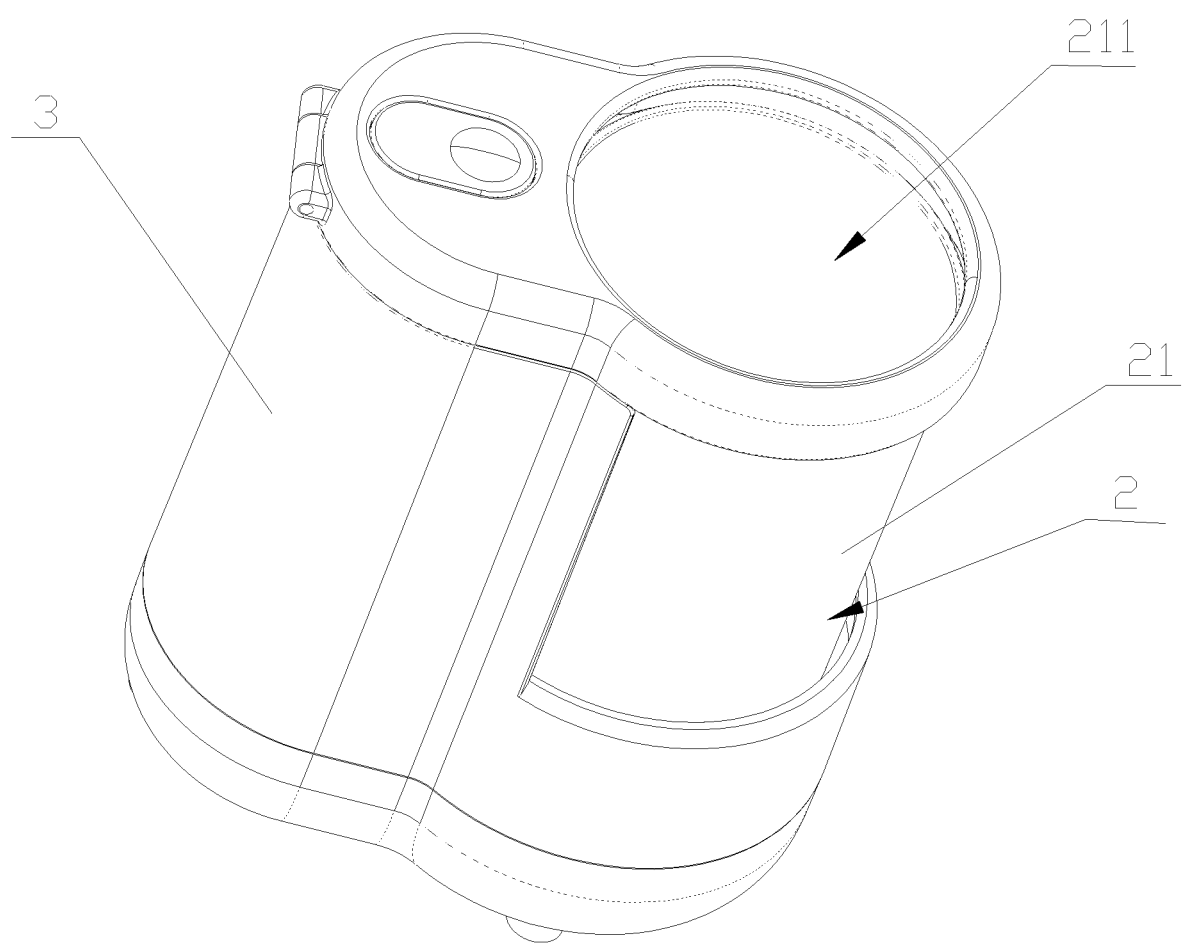
FIG. 2 is a partial structural diagram of a pet foot washer provided by an embodiment of the present application.

In an embodiment, as shown in FIGS. 1 and 2, the pet foot washer further includes an installation seat 3 provided with an installation space (not shown), and the drive assembly 1 is installed in the installation space. Understandably, the installation space is arranged at the bottom of the installation seat 3, and the drive assembly 1 is installed in the installation space, thereby preventing the external environment from damaging the drive assembly 1 and prolonging the service life of the pet foot washer.

In an embodiment, as shown in FIG. 1, the cleaning bucket 2 includes a bucket body 21 provided with the cleaning space 211 and a brush 22 installed in the cleaning space 211; the output shaft 14 is connected to the bucket body 21 or the brush 22. Understandably, the inside wall of the cleaning space 211 is covered all over with the brush 22. Specifically, the pet feet reach into the cleaning space 211, the brush 22 would wrap the pet feet; while the output shaft 14 drives the bucket body 21 and the brush 22 to rotate, the brush 22 would also reciprocate up and down, so that the brush 22 cleans the stains off the pet feet.

Understandably, when the output shaft 14 is connected to the bucket body 21, the brush 22 is fixed on the inner side wall of the bucket body 21, and the bucket body 21 and brush 22 move synchronously. In this way, the cleaning bucket 2 has good sealing performance; when the output shaft 14 is connected to the brush 22, the bucket body 21 remains stationary, the brush 22 reciprocates up and down while rotating in the cleaning space 211.

Figure 7:
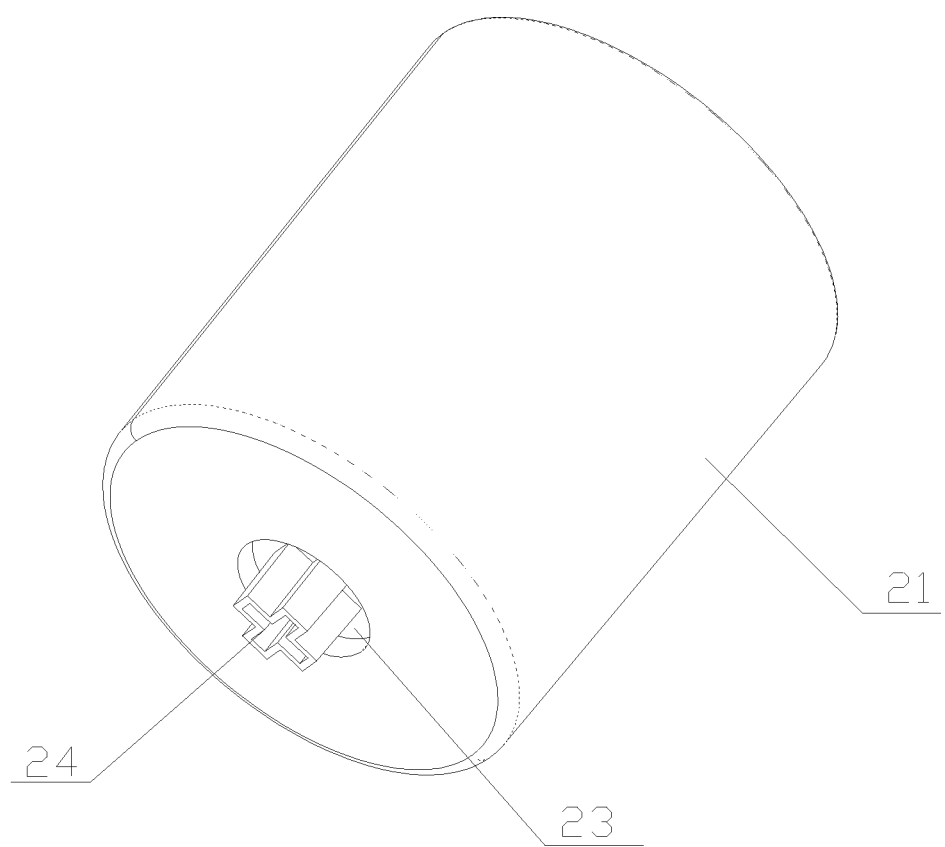
FIG. 7 is a structural schematic diagram of a bucket body of a pet foot washer provided by an embodiment of the present application.

In an embodiment, as shown in FIGS. 6 and 7, the cleaning bucket 2 is provided with a groove 23, and the inner wall of the groove 23 is provided with an insertion part 24; an end of the output shaft 14 away from the wave transmission component 12 is provided with an insertion hole 141, the output shaft 14 is inserted into the groove 23, and the insertion part 24 is inserted into the insertion hole 141. Understandably, the groove 23 is arranged at the bottom of the bucket body 21, and the inner wall of the bottom of the groove 23 protrudes downward to form the insertion part 24; the output shaft 14 is detachably connected to the bucket body 21 through the insertion part 24 inserted into the insertion hole 141. Therefore, the cleaning bucket 2 is easy to disassemble and assemble, which is convenient for cleaning and maintenance of the cleaning bucket 2.

The above are only preferred embodiments of the present application and are not intended to limit the present application. Any modifications, equivalent substitutions and improvements made within the spirit and principle of the present application shall be included in the protection scope of the present application.

What is claimed is:

1. A pet foot washer, comprising a drive assembly and a cleaning bucket with a cleaning space; the drive assembly comprises a drive part, a wave transmission component, an installation block, an output shaft, a first drive pin and a second drive pin; a first end face and a second end face of the wave transmission component are both wave surfaces, the drive part is installed on the installation block, an output end of the drive part is connected with the wave transmission component, the wave transmission component is connected with the cleaning bucket through the output shaft; the first drive pin and the second drive pin are both rotatably installed on the installation block, and the wave transmission component is installed between the first drive pin and the second drive pin.

2. The pet foot washer of claim 1, wherein the first drive pin is provided with a first tapered part abutting against the first end face, and a cross-sectional area of the first tapered part gradually decreases in a direction toward a center of the wave transmission component; and the second drive pin is provided with a second tapered part abutting against the second end face, and a cross-sectional area of the second tapered part gradually decreases in a direction toward a center of the wave transmission component.

3. The pet foot washer of claim 2, wherein an axis of the first tapered part and an axis of the second tapered part both intersect with an axis of the wave transmission component.

4. The pet foot washer of claim 1, wherein both the first end face and the second end face are sine wave faces or cosine wave faces.

5. The pet foot washer of claim 1, wherein the drive assembly further comprises a slide bar, a bottom plate and a top plate, and the bottom plate and the top plate are both installed on the output shaft; the installation block is also provided with a slide hole, the slide bar is connected between the bottom plate and the top plate, and the installation block is slidably installed on the slide bar through the slide hole.

6. The pet foot washer of claim 1, wherein the wave transmission component is a wave gear, and the drive assembly further comprises a drive gear rotatably mounted on the installation block, the output end of the drive part is connected to the drive gear, and the drive gear meshes with the wave gear.

7. The pet foot washer of claim 6, wherein the installation block is provided with a first receiving groove, and a second receiving groove communicating with the first receiving groove; the drive gear is installed in the first receiving groove, and the wave gear is installed in the second receiving groove.

8. The pet foot washer of claim 1, wherein the pet foot washer further comprises an installation seat provided with an installation space, and the drive assembly is installed in the installation space.

9. The pet foot washer of claim 1, wherein the cleaning bucket comprises a bucket body with the cleaning space and a brush installed in the cleaning space; and the output shaft is connected with the bucket body or the brush.

10. The pet foot washer of claim 1, wherein the cleaning bucket is provided with a groove, an inner wall of the groove is provided with an insertion part, an end of the output shaft away from the wave gear is provided with an insertion hole, the output shaft is inserted into the groove, and the insertion part is inserted into the insertion hole.

\* \* \* \* \*